United States Patent [19]

Sunter

[11] Patent Number: 5,895,678
[45] Date of Patent: Apr. 20, 1999

[54] METHOD FOR APPLYING MATERIALS TO SUBSTRATES

[75] Inventor: Adrian M. Sunter, Worcestershire, United Kingdom

[73] Assignee: Ishida Co., Ltd., Kyoto, Japan

[21] Appl. No.: 08/791,315

[22] Filed: Jan. 30, 1997

[30] Foreign Application Priority Data

Jan. 31, 1996 [GB] United Kingdom .................. 9601978

[51] Int. Cl.⁶ ............................ A23B 1/216; A21C 9/04; G01G 13/02
[52] U.S. Cl. .................... 426/289; 426/292; 99/45.01; 99/45.03; 99/494; 177/119; 177/120; 177/122; 177/123
[58] Field of Search .................. 426/289, 292; 99/450.1, 450.3, 484; 77/119, 120, 122, 123

[56] References Cited

U.S. PATENT DOCUMENTS 4,152,976  5/1979  Kawasaki et al. .................. 99/450.1

FOREIGN PATENT DOCUMENTS

| | | |
|---|---|---|
| 0 270 814 | 6/1988 | European Pat. Off. . |
| 2 579 420 | 10/1986 | France . |
| 1 447 279 | 8/1976 | United Kingdom . |
| 2 288 595 | 10/1995 | United Kingdom . |

*Primary Examiner*—Lynette F. Smith
*Assistant Examiner*—Ali R. Salimi
*Attorney, Agent, or Firm*—Staas & Halsey

[57] ABSTRACT

A method and apparatus for applying a material to a substrate. A material application station includes a shutter assembly having at least one horizontally extending blade which is rapidly displaceable from a closed configuration in which an outlet path of the shutter assembly is obstructed to an open configuration in which the outlet path is open. While the blade of the shutter assembly is in the closed configuration, a coating material is applied to a first predetermined area on an upper surface of the shutter assembly. A substrate is located beneath the shutter assembly in the outlet path. The blade of the shutter assembly is rapidly opened so that the coating material falls onto the substrate over a second predetermined area on an upper surface of the substrate. The second predetermined area is substantially equal to the first predetermined area. The resulting deposit is of a controlled diameter. A rapid opening of the iris blade allows the deposit to fall a short distance onto a substrate such as a pizza base.

14 Claims, 4 Drawing Sheets

5,895,678

METHOD FOR APPLYING MATERIALS TO SUBSTRATES

CROSS-REFERENCE TO RELATED APPLICATIONS

This application is based upon and claims priority of British Patent Application No. 9601978.1, filed Jan. 31, 1996, the contents being incorporated herein by reference.

BACKGROUND OF THE INVENTION

1. Field of the Invention

The present invention relates to applying materials to substrates, and more particularly, to applying metered quantities of materials, such as topping materials, to food substrates, such as pizza bases.

2. Description of the Related Art

The current industrial technique for applying toppings to pizza bases employs a slow-moving conveyor to discharge the toppings onto pizza bases below. A mound of topping material is applied to the upper run of the slow-moving conveyor and is discharged as a "waterfall" using a rotating brush at the end of the slow-moving conveyor. Pizza bases are carried on a separate conveyor located underneath the slow-moving conveyor so as to pass through the "waterfall" of topping material. An example of this conventional technique is illustrated in FIG. 6. FIG. 7 shows a top view of the lower conveyor of FIG. 6, conveying pizza bases in three lanes.

In this conventional technique, however, there is little control of the amount of material applied to each base or its distribution, because a varying amount of the topping material continuously falls off the end of the top conveyor and is randomly distributed below, regardless of whether a pizza base is properly aligned underneath on the lower conveyor. Thus, there is also likely to be much waste of the topping, because much of the topping does not even land on the pizza base.

SUMMARY OF THE INVENTION

It is therefore an object of the present invention to accurately control the amount and distribution of materials applied to a substrate.

It is a further object of the present invention to prevent a waste of the materials applied to the substrate.

Yet a further object of the present invention is to use a gating mechanism to accurately release the material onto the substrate.

The above objects are achieved in accordance with the present invention by providing a method for applying a material to a substrate by a material application station having a shutter assembly having at least one horizontally extending blade which is rapidly displaceable from a closed configuration in which an outlet path is obstructed to an open configuration in which the outlet path is open. The method includes the steps of disposing the blade of the shutter assembly in the closed configuration and applying coating material to the upper surface thereof; locating a substrate beneath the shutter assembly in the outlet path; and rapidly opening the shutter assembly so that the coating material falls onto the substrate. The opening of the shutter assembly is preferably effected so rapidly that the coating material is substantially undisturbed.

Preferably the coating material is applied to the shutter assembly over an area bearing a predetermined relationship to the area of the substrate. This may be achieved by dropping a controlled amount from a predetermined height, and/or by using a diameter control mask. For dropping from a controlled height, use may be made of an upper shutter assembly which will generally have a smaller outlet path than the lower one. Preferably the predetermined height can be varied. Thus the upper shutter assembly may be mounted so as to be vertically displaceable.

Substrates may be conveyed through the application station. Arrival of a substrate may be detected automatically. This may trigger the operation of the shutter assembly or assemblies. It may also cause the conveying of the substrate to be halted momentarily.

The present invention further provides an apparatus for use in carrying out the above method, including a lower shutter assembly having at least one horizontally extending blade, and an upper shutter assembly disposed vertically above the lower shutter assembly with a predetermined spacing so that material can be accumulated on the upper shutter assembly and then dropped onto the lower shutter assembly. The material is collected over a relatively small diameter on the upper shutter assembly, and the action of dropping the material onto the lower shutter assembly leads to a deposit of a larger diameter.

There may be a mask associated with the lower shutter assembly to control the spreading of the material. This may be an annular element or assembly, generally of relatively low height (compared with the spacing of the shutters). It may be a simple tube, which may be replaceable by tubes of different shapes and/or sizes (e.g. round tubes for pizzas, square or triangular ones for sandwiches). A more sophisticated tubular mask may be variable. Thus a circular mask may be adjustable like an expanding cake-tin or like a hoseclip, adjustable by turning a screw. Generally the bottom of the mask will be very close to, or even in contact with, the blade(s) of the shutter. Generally the upper shutter assembly is smaller than the lower one. Preferably there is a shutter mounting device such that the spacing of the upper and lower shutter assemblies is variable. There may be a weighing machine for applying weighed amounts of the material.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
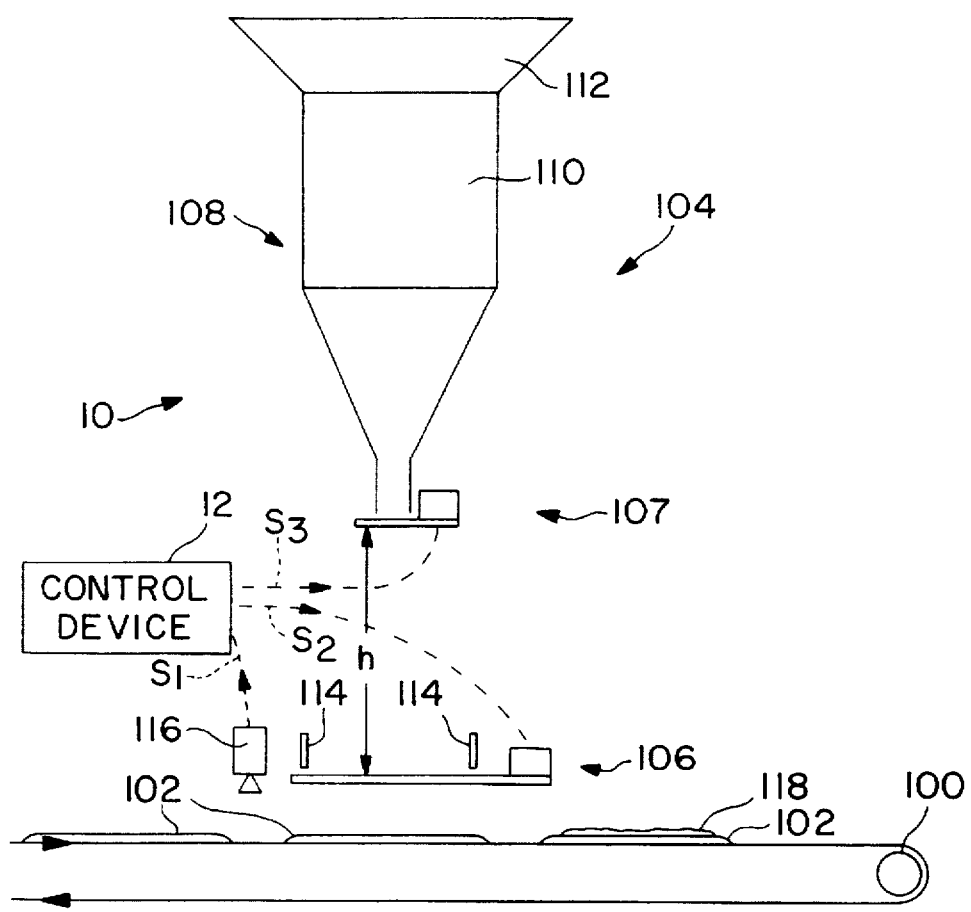
FIG. 1 is a schematic view of a pizza coating apparatus embodying the present invention.

Reference will now be made in detail to the present preferred embodiments of the present invention, examples of which are illustrated in the accompanying drawings, wherein like reference numerals refer to like elements throughout.

In FIG. 1, reference numeral 10 generally designates the pizza coating apparatus of the present invention. The apparatus includes a lower conveyor 100 (here shown as a conveyor belt) for conveying pizza bases 102 through a topping application station 104. The station includes a large lower shutter assembly 106 and a small upper shutter assembly 107. These are coaxial, and vertically spaced by a distance h. Each shutter assembly may have a shutter of the same type (though differing in diameter), having a plurality of horizontally extending and horizontally displaceable blades which are rapidly movable from a "closed" configuration to an "open" configuration.

Figure 2:
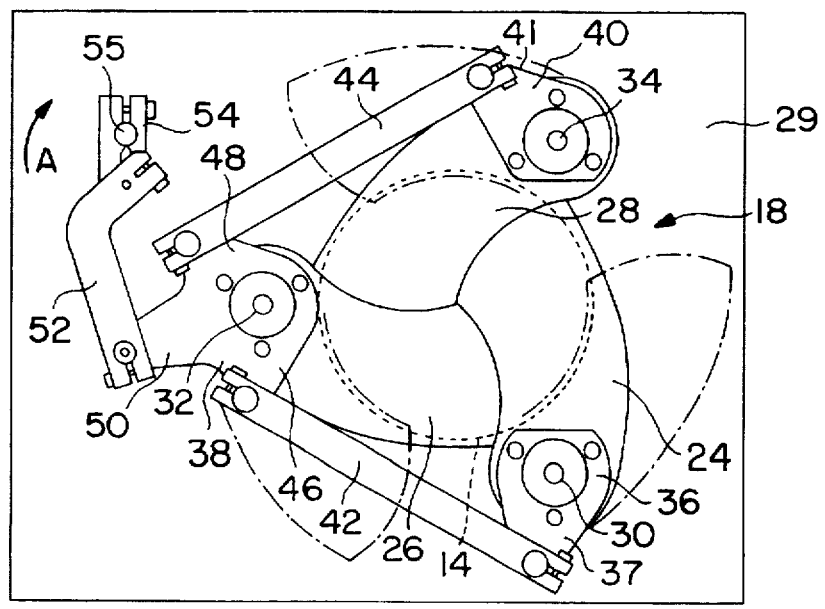
FIG. 2 shows a shutter assembly suitable for use in the apparatus of FIG. 1.

Each shutter assembly, or at least the lower assembly 106, is advantageously of the type disclosed in application GB-A-2,288,595 corresponding to U.S. patent application Ser. No. 08/727,675 filed Oct. 17, 1996, the disclosure of which is hereby incorporated by reference, and which is shown in FIG. 2 of the accompanying drawings. This patent application provides details of the shutter operation which is discussed below with respect to FIG. 2.

FIG. 2 shows an iris-type shutter mechanism 18 provided to control an opening 14. There are three identical blades 24,26,28. In FIG. 2 they are shown in full lines in their closed position, and in chain-dotted lines in the fully open configuration. They are pivotally mounted via blade supports 36,38,40 on a base 29 by pivot pins 30,32,34. The blades are secured to the blade supports for rotation therewith about the pivot pin. One of the blade supports 38 is in the form of a double bell crank lever having a pair of outer legs 46,48 and a longer central leg 50. The other blade supports 36,40 each have a single leg 37,41. The central leg 50 of the double bell crank lever 38 is pivotally connected to one end of a link 52 whose other end is pivotally connected to a drive crank 54. The outer legs 46,48 of the double bell crank lever are each pivotally connected to one end of a respective link 42,44 whose other end is pivotally connected to a respective leg 37,41 of one of the other blade supports 36,40. In use, the drive crank 54 is rotated through 180° by the drive shaft 55 from the position shown in FIG. 2. This moves the link 52 to cause the double bell crank lever 38 to turn clockwise. This motion is transmitted to the other blade supports 36,40 via the links 42,44. Thus all of the blades 24,26,28 rotate from the closed position to the open position. For closing the blades, the drive crank 54 may be driven around a further 180°, or back through the original 180°.

Referring back to FIG. 1, metering assembly 108 is provided for applying a controlled amount of topping material to the upper shutter assembly 107. This will generally include a weighing machine 110 and a topping inlet hopper 112. In operation, an amount of topping sufficient for one pizza is first accumulated on the upper shutter assembly 107. This may be of diameter 50–70 mm (this being the diameter of the opening in the "open" configuration). With the lower shutter assembly 106 remaining closed, the upper shutter assembly 107 is opened, allowing the topping material to fall through the height h. This height is selected in dependence on the nature of the material, and its tendency to spread. There may be some spreading as it falls, and further spreading once it impacts on the blades of the lower shutter assembly 106. The degree of spreading is controlled by a product diameter control mask 114. The predetermined final diameter may be selected to be slightly less than that of a pizza base 102.

The arrival of a pizza base 102 beneath the lower shutter assembly 106 is detected by a detector 116, which is arranged to control the opening of the lower shutter assembly 106. The blades thereof open so rapidly (i.e., approximately 0.30 second) that the coating is virtually undisturbed (as when a conjurer whips a table cloth out from under an array of crockery, but with the difference that, in this case, there is no table to support it). Thus the spread topping 118, of predetermined diameter, falls through the relatively short distance onto the pizza base 102 beneath. (The conveyor 100 may be halted while this happens, though this may not be necessary, depending on speeds and distances involved). As a result, for example, the present invention can top approximately 90 pizzas in 1 minute, with a highly accurate amount and distribution of the topping on the pizza.

The detector 116 may be a conventional photoelectrical device, optical sensor or ultrasonic sensor. The detector 116 detects an edge of the pizza arriving underneath the shutter assembly 106, and sends a signal $S_1$ to the control device 12. Control device 12 may be a programmable logic controller (PLC). When the control device 12 receives the signal $S_1$ from the detector 116, it waits a first predetermined amount of time (i.e., a first delay time), which corresponds to the time when substrate 102 is properly aligned under the shutter 106, and then sends a signal $S_2$ to lower shutter assembly 106 to rapidly open its blades 24, 26 and 28 to discharge the topping and then to close its blades. The control device 12 further waits a second predetermined amount of time (i.e., a second delay time) and then sends a signal $S_3$ to upper shutter assembly 107 to open and discharge the topping to the lower shutter assembly 106 and then to close its blades. The timed opening and closing of the two shutter assemblies 106 and 107 may be referred to as a "gating mechanism". The prior art does not have this gating mechanism. The upper shutter assembly 107 receives discrete weighed amounts of topping (i.e., approximately 0.30 to 4.00 ounces of topping per pizza) from metering assembly 108.

Figure 3:
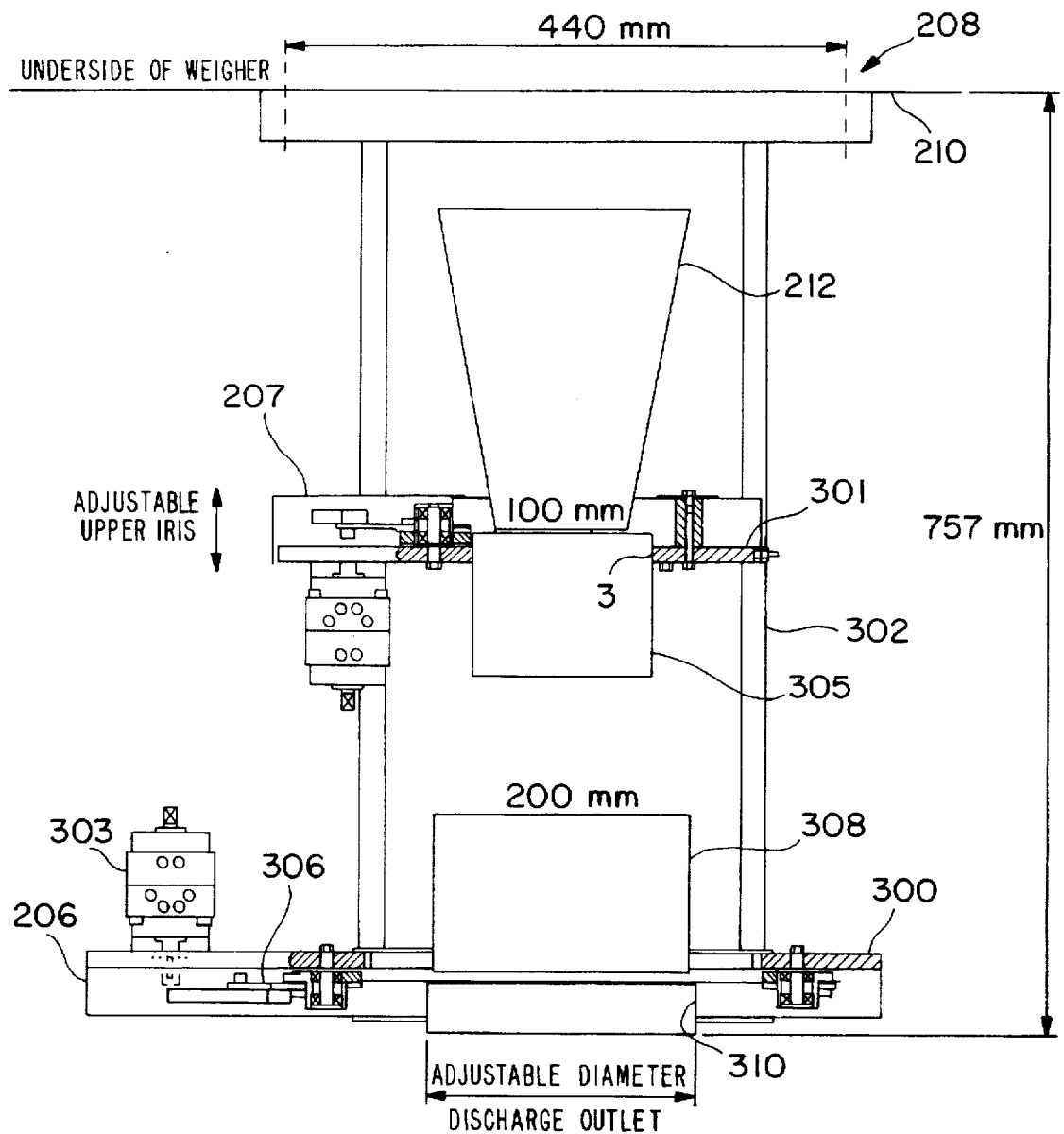
FIG. 3 is a schematic view of a second embodiment of a coating apparatus of the present invention.

FIG. 3 shows a second embodiment of a coating apparatus which may be used for coating pizzas or other substrates. The lower conveyor and control apparatus are not shown, but may generally be similar to those shown in FIG. 1. Elements shown in FIG. 3 which correspond to elements in FIG. 1 will be given the same reference numerals but raised by 100. Thus there is a large lower shutter assembly 206 and a smaller upper shutter assembly 207. The apparatus has a base plate 300 which supports the components of the lower shutter assembly 206, and from which rise shafts 302 on which the upper shutter assembly 207 is slidably mounted. (There are locking means (not shown) by which upper shutter assembly 207 can be locked at any desired height above the lower shutter 206.) The upper shutter assembly 207 includes a baseplate 301 with an outlet aperture 3 controlled by the shutter blades. In this example the aperture is openable to a circular opening of diameter 100 mm. A tubular shield 305 of somewhat greater internal diameter projects downwardly from the level of the shutter blades. A metering assembly 208 comprises a weighing machine 210 (whose underside is shown) and a topping inlet hopper 212, mounted for travel with the upper shutter assembly 207.

Figure 4:
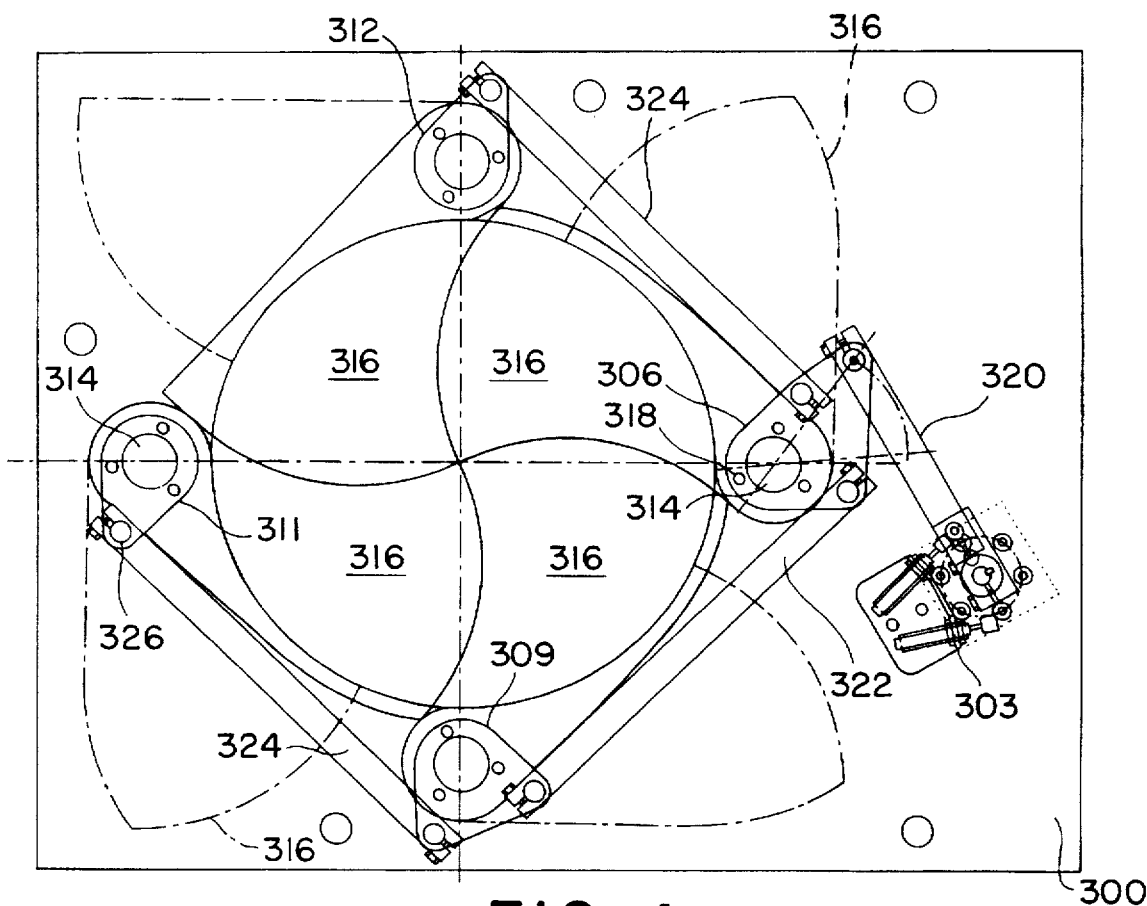
FIG. 4 is a plan view of the lower shutter assembly of the apparatus of FIG. 3.
Figure 5:
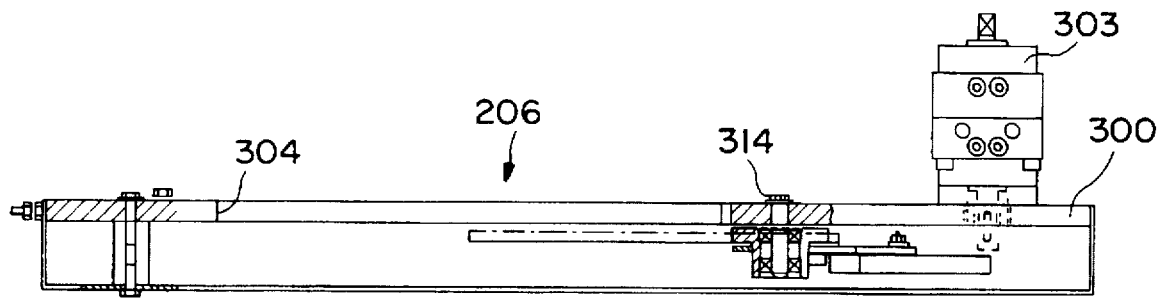
FIG. 5 is a partial axial section through the shutter assembly of FIG. 4.
Figure 6:
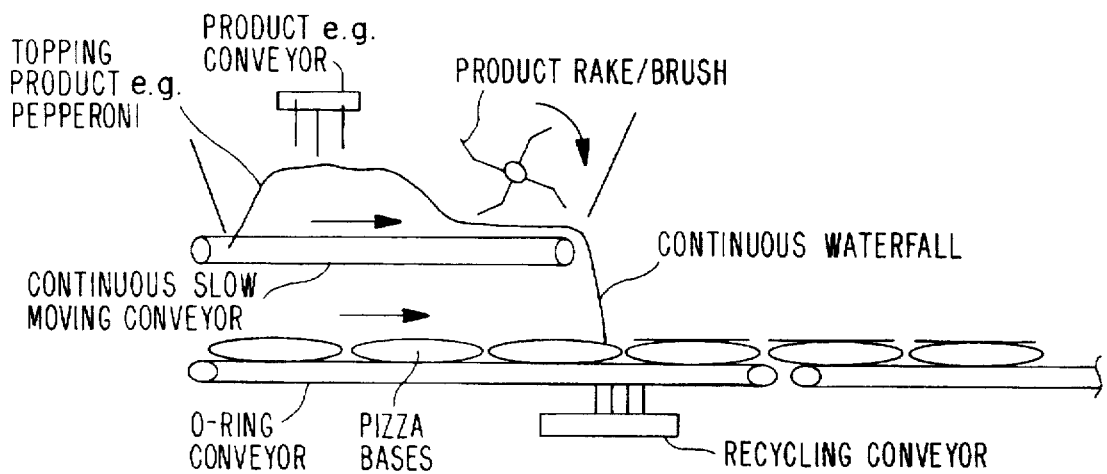
FIG. 6 (PRIOR ART) shows a conventional pizza coating apparatus.
Figure 7:
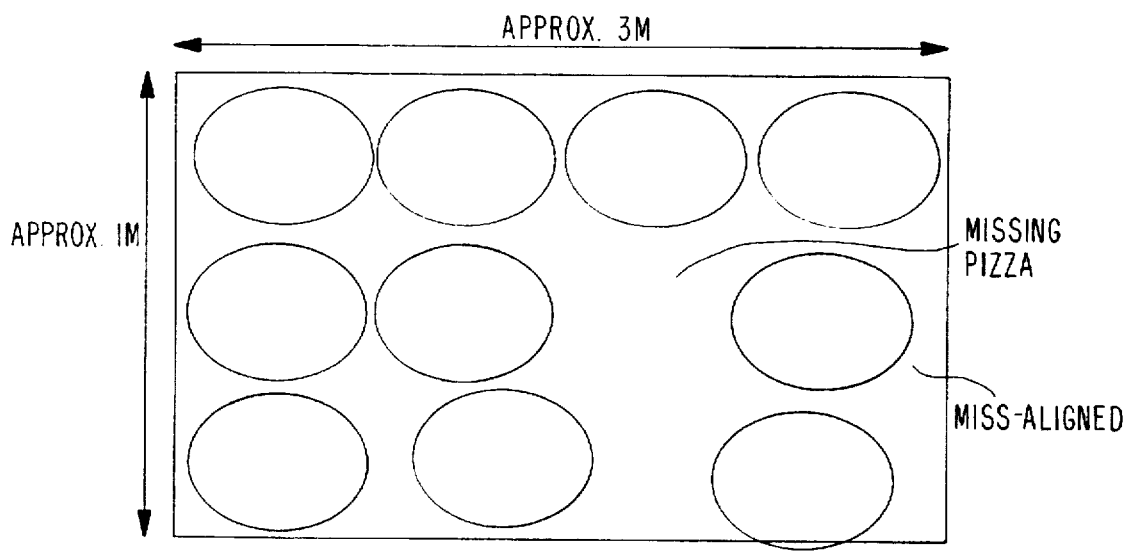
FIG. 7 (PRIOR ART) is a plan view of a conventional pizza conveyor of FIG. 6.

The lower shutter assembly 206 is shown in more detail in FIGS. 4 and 5. The baseplate 300 carries a drive motor 303. The plate 300 has a central outlet aperture 304, which is circular in this example. Equally spaced around its periphery, four blade supports 306,309,311,312 are pivotally mounted to the baseplate 300 by pivot pins 314. The support plate 306 adjacent the motor 303 is approximately triangular. One vertex region is connected to a blade 316 by three pins 318. Another vertex is pivotally connected to a drive crank 320 whose other end region is coupled to the motor 303. Two links 322,324 are pivotally connected to the blade support 306. The first link 322 is connected adjacent the third vertex of the blade support 306. The second link 324 is connected at a point adjacent a side of the support 306, slightly outwardly of a line joining the centers of the pivot pin 314 and the axis of the crank lever 320. The first link 322 leads to the second blade support 309. This has three pivotal connections, arranged as a right-angled triangle. The pivotal connection at the right angle is the pivot pin 314, coupling it to the base plate 300. At this region the support plate is connected to a blade 316. One of the other vertices is connected to the first link 322, while the remaining vertex is connected to a third link 324. This leads to a third blade support 311, where it is pivotally connected by a first pivotal connection 326. The only other pivotal connection is provided by the main pivot pin 314, connecting it to the base plate 300. In this region it is connected to the third blade 316.

The second link 324 leads to the fourth blade support 312, which is identical to the third blade support 311 and is connected to the fourth blade 316. The blades are shown in full lines in their closed configuration, in which they meet edge-to-edge to close off the outlet opening 304. The blades are also shown in their fully open configuration, in dash-dotted lines, in which they leave the opening 304 entirely unobstructed.

As shown in FIG. 3, a mask 308 in the form of a tubular wall is mounted to the baseplate 300, coaxially with the outlet aperture 304. It extends upwardly, towards the coaxial upper shield 305. Its internal diameter is 200 mm. A coaxial adjustable-diameter discharge outlet 310 projects a short distance below the aperture 304.

Although preferred embodiments have been shown and described, it would be appreciated by those skilled in the art that changes may be made in these embodiments without departing from the principles and spirit of the invention, the scope of which is defined in the claims and their equivalents.

What is claimed is:

1. A method for applying a coating material using a shutter assembly, comprising the steps of:

disposing the shutter assembly in a closed configuration;
applying the coating material to a predetermined area of the shutter assembly;
locating a substrate in an outlet path of the shutter assembly; and
rapidly opening the shutter assembly to transfer the coating material over a predetermined area of the substrate substantially equal to said predetermined area of the shutter assembly.

2. The method according to claim 1, wherein said step of opening the shutter assembly is effected so that the coating material is substantially undisturbed.

3. The method according to claim 1, wherein the coating material is applied to the shutter assembly over an area bearing a predetermined relationship to an area of the substrate.

4. The method according to claim 1, wherein said step of applying said coating material to the shutter assembly includes the step of dropping a controlled amount of the coating material from a predetermined height.

5. The method according to claim 1, further comprising the step of controlling the application of the coating material to said predetermined area of the shutter assembly.

6. The method according to claim 1, wherein said step of applying said coating material to the shutter assembly includes the step of dropping said coating material from a second upper shutter assembly at a controlled height onto the shutter assembly.

7. The method according to claim 6, wherein said second upper shutter assembly has a smaller outlet path than said outlet path of said shutter assembly.

8. The method according to claim 1, further comprising the steps of automatically conveying a plurality of substrates through the outlet path and automatically detecting an arrival of each of the plurality of substrates at said outlet path.

9. The method according to claim 1, wherein the substrate includes a pizza base.

10. A method for applying a material to a substrate, comprising the steps of:

opening a first shutter assembly to transfer the material a predetermined distance to a second shutter assembly located under said first shutter assembly; and
rapidly opening said second shutter assembly to release said material onto a predetermined area of the substrate.

11. The method according to claim 10, said releasing step further comprising the steps of:

closing said second shutter assembly; and
applying said material to a first predetermined area on an upper surface of said second shutter assembly, wherein said first predetermined area is approximately equal to the predetermined area of the substrate.

12. The method according to claim 11, further comprising the steps of:

automatically conveying a plurality of substrates under said second shutter assembly; and
automatically detecting an arrival of each of said plurality of substrates under said second shutter assembly.

13. The method according to claim 12, further comprising the step of:

controlling a timing of an opening and closing of said first shutter assembly and a timing of an opening and closing of said second shutter assembly based on said detecting step.

14. A method for applying a material to a substrate, comprising the steps of: detecting the substrate;

opening a lower shutter assembly to release the material onto a predetermined area of the detected substrate;
closing the lower shutter assembly;
opening an upper shutter assembly to transfer material to a predetermined area of the lower shutter assembly approximately equal to the predetermined area of the substrate.

* * * * *